United States Patent
Jones et al.

(10) Patent No.: US 6,426,130 B2
(45) Date of Patent: *Jul. 30, 2002

(54) MOLDABLE PRESSURE SENSITIVE ADHESIVE FOR AUTOMOTIVE TRIM PANELS

(75) Inventors: Vincent H-H Jones, Leonard, MI (US); Edward Kuivinen, Canal Fulton, OH (US); David W. Sloat, Clinton Township; Jerry P. Wilson, Armada, both of MI (US)

(73) Assignees: Simco Automotive Trim, Inc., Roseville, MI (US); SIA Adhesives, Inc., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,120

(22) Filed: Jul. 14, 1998

(51) Int. Cl.$^7$ ............................ B32B 33/00; B28B 5/00
(52) U.S. Cl. ...................... 428/41.8; 428/174; 264/241; 264/319
(58) Field of Search ................................ 428/40.1, 41.7, 428/41.8, 158, 160, 159, 174; 264/46.4, 46.8, 46.6, 255, 271.1, 241, 319; 296/146.7

(56) References Cited

U.S. PATENT DOCUMENTS

| | | | | |
|---|---|---|---|---|
| 5,073,429 A | * | 12/1991 | Steinke et al. | 428/71 |
| 5,962,089 A | * | 10/1999 | Jones et al. | 428/31 |
| 6,001,471 A | * | 12/1999 | Bries et al. | 428/343 |

* cited by examiner

Primary Examiner—Donald J. Loney
(74) Attorney, Agent, or Firm—Cook, Alex, McFarron, Manzo, Cummings & Mehler, Ltd.

(57) ABSTRACT

An automotive trim panel has a thermoformable structural layer shaped into a non-flat contour with a pressure sensitive adhesive system applied to one side of the panel. The pressure sensitive adhesive is coated onto a release liner which is then attached to the structural layer. Both the adhesive and release liner are capable of withstanding the high heat of thermoforming. The trim panel can be applied to a substrate by peeling away the release liner and sticking the panel to the substrate.

23 Claims, 1 Drawing Sheet

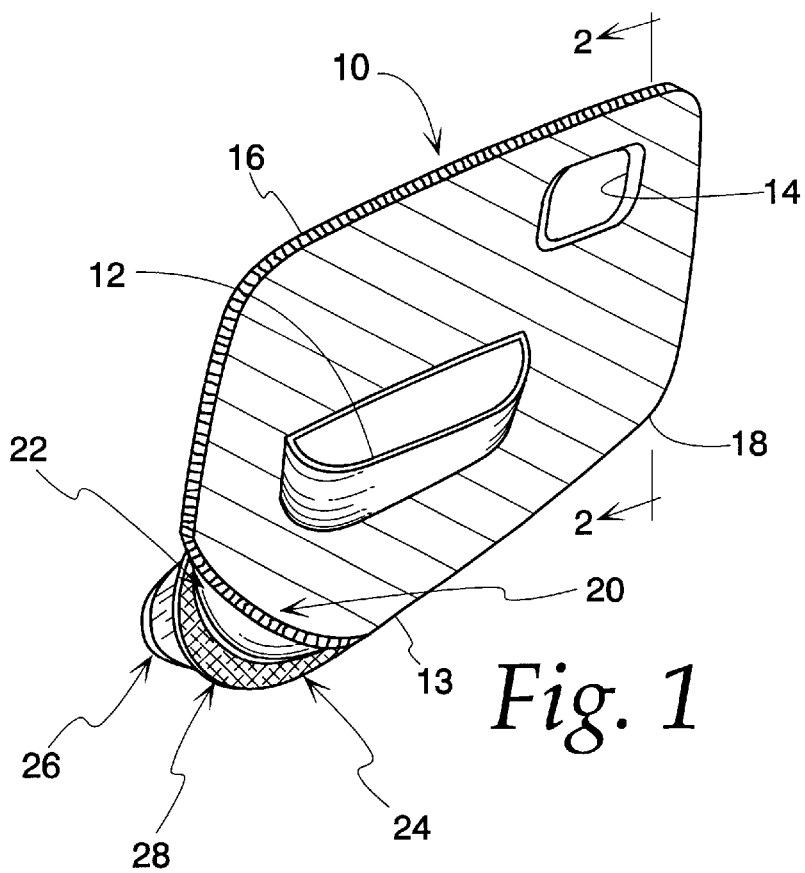
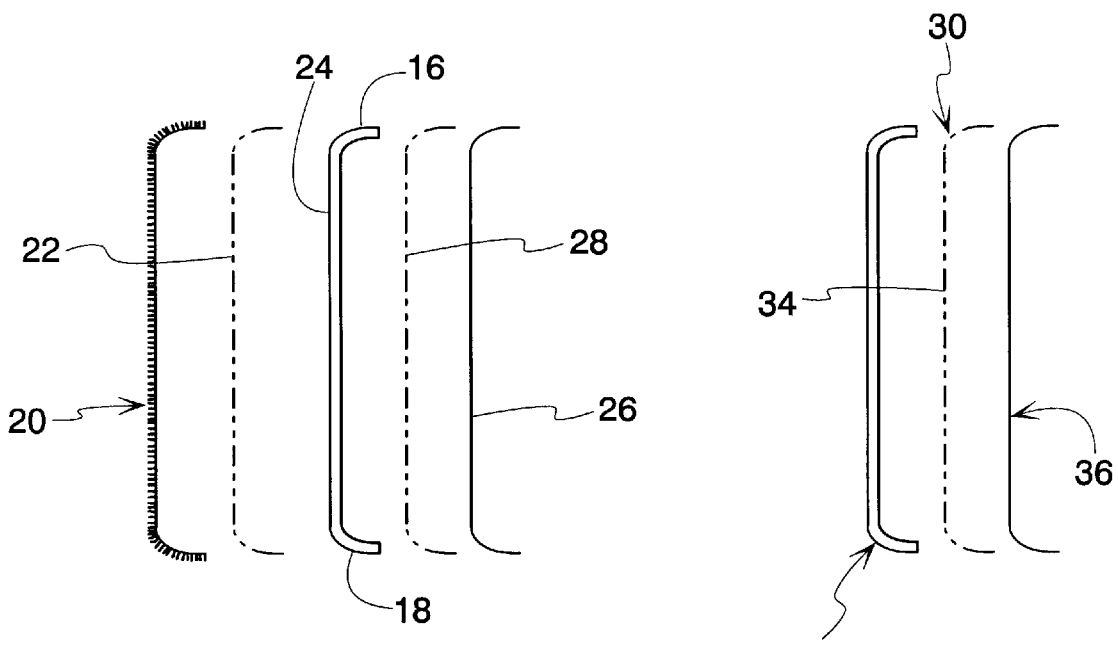

MOLDABLE PRESSURE SENSITIVE ADHESIVE FOR AUTOMOTIVE TRIM PANELS

BACKGROUND OF THE INVENTION

This invention relates to a pressure sensitive adhesive system for use in moldable automotive trim panels. Automotive trim panels are used to cover the hard surfaces of car interiors. Parts such as instrument panels, armrests, center consoles, seating, head rests, door skins and body pillar trim are some of the components provided with interior trim panels. These components typically comprise a structural substrate of aluminum, ABS or polypropylene. The surfaces are covered by a trim panel which typically has a vinyl or textile outer surface cushioned by a layer of foam padding underneath. The outer surface exposed to the vehicle passenger is referred to as an A-side layer. Typical materials for the A-side layer are leather, vinyl or textile materials such as cloth or carpet.

A desirable characteristic of a trim panel is that it have a padded or cushioned feel, for both styling and safety purposes. Also, for ease of installation, it is preferred that the trim panel be pre-formed to a contour that matches that of the underlying substrate to which the panel is applied. While the typical A-side materials have suitable qualities in terms of durability and appearance, none of them by themselves provide a padded or cushioned feel, nor can they be formed into a permanently contoured shape. Accordingly, a layer that provides padding and structure must be attached to the A-side material, such that it will lie between the substrate and the A-side layer. A suitable trim panel that is padded and formable to retain the contour of the substrate is described and claimed in U.S. patent application Ser. No. 08/797,643, now U.S. Pat. No. 5,962,089 invented by Vincent H-H. Jones and David L. Simon and in U.S. patent application Ser. No. 08/797,646, now U.S. Pat. No. 5,847,961 invented by Vincent H -H. Jones, David L. Simon and Scott M. Kloock, both filed on Jan. 31, 1997. The disclosures of these two applications are incorporated herein by reference.

The two patent applications describe a technique for thermoforming an automotive trim part formed of an A-side material laminated to a thermoformable foam layer. The material of the applications provides a self-supporting, padded trim panel, contoured to match a non-flat substrate and ready for attachment thereto. The present invention is directed to a construction for attachment of the trim panel to a substrate and is particularly concerned with a pressure sensitive adhesive which can be applied prior to the thermoforming of the part.

Pressure sensitive adhesive (PSA) systems comprise an adhesive layer covered by a removable release liner. These systems are also referred to as peel and stick adhesive systems. In general, PSA systems are not new. Bumper stickers, window decals, two-way tape and new postal stamps are all examples of PSA technology. The idea of using PSA for flat automotive trim panels is also known. There are many examples of substantially flat items of carpet, cloth, insulation and other trim pieces being applied to cars and trucks. While the performance requirements for automotive applications are more stringent than for a window decal (for example, the automotive component must withstand heat and cold cycles ranging from −30° F. to +212° F.), the general concept and methods of making the parts are essentially the same. In each case, a substantially flat adhesive layer and a release liner are applied to a substantially flat item. The end user or an assembly plant worker then removes the release liner and applies the item to its intended position, manipulates the part in place until it is properly located, and then applies pressure to wet-out the adhesive and adhere the part.

PSA represents a tremendous advantage to the automotive industry, particularly over hot-melt adhesives, for a number of reasons:

1. A PSA system eliminates "open time" as a factor in bond performance. Open time is the maximum amount of time an operator has available to complete the assembly of two or more components once the adhesive is ready for assembly;

2. No external heat source is required. A PSA system uses only normal ambient room temperature to secure components. This eliminates the potential for injuries resulting from the use of heat-activated processes like hot-melt adhesives;

3. PSA eliminates the need for adhesive dispensing equipment and the traditional application of adhesive at assembly. This also eliminates equipment such as robots, glue guns, etc., as well as environmental and safety issues sometimes associated with gluing operations;

4. PSA eliminates applying adhesive promoters to the back of a trim panel intended for use with a low surface energy substrate such as polypropylene. Such promoters are necessary to make traditional gluing systems work;

5. PSA technology allows for more consistent application of the adhesive layer, improving quality and allowing for the use of adhesives targeted at tough applications such as bonding to polypropylene. All of the above represent cost savings.

With all of the clear advantages, there is a strong desire for a PSA system for non-flat, contoured automotive trim panels which has heretofore not been satisfied. The reasons for this are as follows:

1. Lack of a PSA system which lends itself to being molded into a contoured shape;

2. Lack of a PSA system which will withstand the temperatures typically used in molding automotive trim components such as door bolsters. Such temperatures typically range from 300° F. to 700° F.;

3. Lack of a method for making dimensionally repeatable contoured automotive trim panels which has the tooling and process controls required for handling a PSA system; and 4. Lack of a method to manufacture a PSA system which can withstand items 1, 2 and 3 above.

The above difficulties have led to failures with PSA systems in contoured trim panels. These failures include the release liner wadding up, the part material getting stuck in the tooling, the release liner tearing during the molding process, and the PSA system being burned away during the molding process.

SUMMARY OF THE INVENTION

The present invention is directed to a pressure sensitive adhesive for moldable automotive trim materials and to a non-flat automotive trim part having the PSA system applied thereto.

The trim panel has an A-side layer laminated to a thermoformable layer. A pressure sensitive adhesive is applied to the thermoformable layer and covered by a release liner that can withstand the high heat of thermoforming. The part is then thermoformed at a temperature of at least about 300° F. or at least about 350° F. The release liner is preferably a polyester film with a differential release silicone treatment. That is, the polyester film has a silicone coating or layer on both sides, but one of the silicone layers has an inhibitor added so that the pressure sensitive adhesive sticks more tightly to that side than the other side. The silicone treated polyester film is said to have a "tight" side and a "loose" side. The pressure sensitive adhesive is applied to the tight side; the film can then be rolled up on itself and when it is unrolled, the adhesive will preferentially adhere to the tight side and release from the loose side. The pressure sensitive adhesive system can be applied to the thermoformable layer at the time the thermoformable layer is laminated to the A-side layer. Or, the PSA system could be applied separately from the lamination of the A-side and thermoformable layers.

BRIEF DESCRIPTION OF THE DRAWINGS

FIG. 1 is a schematic perspective view of an automotive trim part with a corner fanned apart to illustrate the layers making up the part.

FIG. 2 is an exploded section taken along line 2—2 of FIG. 1.

FIG. 3 is a section similar to FIG. 2, showing an alternate embodiment.

DETAILED DESCRIPTION OF THE INVENTION

An automotive trim panel made in accordance with the present invention is shown generally at 10 in FIG. 1. This particular example is for a door. The present invention may also be used for other automotive trim panels or components, including trim bolsters, console panels, glove box doors, sail panels, door bolsters, door trim, quarter trim, and less preferably package tray panels, instrument panels and headliners. The panel 10 defines a contour which includes an arm rest 12, a door latch opening 14 and curved upper and lower edges 16 and 18. In particular, the arm rest 12 causes the panel to have a non-flat, contoured shape. The non-flat, contoured shape of the panel is imparted by a thermoforming process as described in the patent applications referred to above. The panel has an A-side material on its outer surface, a thermoformable layer laminated to the A-side material by an adhesive layer, and a pressure sensitive adhesive (PSA) system on the inner surface of the thermoformable layer. The PSA system allows installation of the panel by removing a release liner, positioning the panel in the correct location on a substrate (which in this case would be the interior structural member of a door), and pressing the panel in place to fully activate the adhesive and set the bond between the panel and substrate.

The panel material is shown in FIG. 2. It includes an A-side layer 20, such as vinyl, leather, cloth or carpet. An adhesive layer 22 laminates A-side layer 20 to a thermoformable layer 24, such as urethane foam, polypropylene foam, felt or polyethylene foam. The thermoformable layer can be any material that will be self-supporting after thermoforming, i.e., the formed material has sufficient stiffness or rigidity to retain a contoured shape and will not crumple under its own weight. Further details of the A-side layer and thermoformable layer and methods of laminating them together are disclosed in the patent applications referred to above. Taken together the A-side layer, adhesive layer and thermoformable layer may be considered a structural layer.

The PSA system comprises a release liner 26 and a pressure sensitive adhesive layer 28. The release liner 26 is a moldable film that can retain its shape after thermoforming and withstand the high heat (300° F. to 700° F., more preferably 350° F. to 400° F.) required to thermoform the materials used for automotive trim panels. Polyester film has been found to be a suitable release liner material. A differential silicone treatment is applied to the surfaces of the polyester film. The adhesive is applied to the "tight" side of the liner, i.e., the side with the inhibitor. A preferred polyester film release liner is Product No. 2-2PESTR(P2)-6200&4320C, available from Daubert Coated Products of Westchester, Ill., which is a 2 mil polyester film with differential release silicone treatment. A less preferred release liner from Daubert is Product No. 2-PESTR(P2)-4000&4320C. The polyester film release liner is preferably 1–6, more preferably 2–6, more preferably 2–4, and optimally about 2, mils thick.

The adhesive layer is preferably a styrene isoprene styrene block copolymer pressure sensitive adhesive. A suitable example of this type of adhesive is PL915M available from SIA Adhesives, Inc. of Akron, Ohio. This adhesive has the desirable characteristic of being repositionable. That is, a part can be lightly placed in position and if the position is not correct, the part can be lifted off the substrate and repositioned to the correct location. The adhesive will not produce a full bond until heat or pressure are applied (or after an appreciable passage of time). The adhesive is 100% solids as there is no solvent or the like to keep it in a dispersed state. Less preferably the adhesive may be a styrene-butadiene-styrene pressure sensitive adhesive, such as Products 8706, 8707, 8709 and 1191 from Avery Dennison, Fasson Films Div., Painesville, Ohio. Further less preferable alternate pressure sensitive adhesive systems include acrylic, butadiene-acrylonitrile, butyl rubber, natural rubber, silicone, polychloroprene, polyvinyl acetate, polyvinyl ether, polyurethanes or other synthetic rubber or resin systems. Other useful PSAs are shown in U.S. Pat. No. 4,820,746, the disclosure of which is incorporated herein by reference.

Preferably the pressure sensitive adhesive meets the heat resistance requirements of General Motors Specification No. 3608 Type 1 Grade A and Chrysler Specification No. MS-CC925 Type A. SIA Adhesives' Product No. PL915M meets both of these specifications. For automotive trim panels in some higher heat areas of the car, such as the instrument panel and rear package tray and other areas at or above the "belt line" (the lower edge of the glass in the doors and windshields), it is preferred that the pressure sensitive adhesive meet Grade B of the GM specification mentioned above.

When preparing the PSA system, the adhesive is heated to a liquid state and cast or coated onto a moving release liner in a coating machine, e.g., a slot die coater. The adhesive layer preferably has a thickness of 4–16 mils, more preferably 6–12 mils, more preferably about 8 to about 12 mils, which has been found to produce effective bond strengths. Once the adhesive solidifies on the release liner, the liner and adhesive may be immediately attached to the structural layer, such as by a nip roller. Or the liner and adhesive may be rolled up for transportation and/or storage followed by subsequent unrolling and lamination to the structural layer. When the adhesive is applied to a foam structural layer, unprimed foam has produced acceptable results.

Less preferably, the pressure sensitive adhesive can be applied to the thermoformable layer 24 by spray coating, roll coating, slot die coating, or other coating technique known in the art, and then the protective release liner is applied on top of the adhesive layer. The part is then subsequently thermoformed. Another alternate application method is laminating the adhesive to the thermoformable layer, as described below. If the adhesive is first applied to the thermoformable layer, it is possible to use a release liner having a silicone treatment only on the side of the liner facing the adhesive. Thus, the outer face of the release liner would not necessarily have to have the silicone treatment, leading to cost reduction.

Another alternative method of applying the pressure sensitive adhesive to a structural layer is to first apply the adhesive to a carrier sheet, laminate this sheet to the structural layer and then replace the carrier sheet with a polyester release liner The carrier sheet has a differential release silicone treatment so the carrier sheet acts like a release liner. The carrier sheet could be made of an inexpensive material that is not necessarily thermoformable, such as paper. The adhesive and carrier sheet is laminated to the structural layer on the side opposite the A-side material. Thereafter, the carrier sheet is removed, leaving the adhesive on the structural layer. Finally the adhesive is covered by a moldable release liner, such as polyester, making the panel ready for thermoforming. This method has the advantage of permitting preparation of the adhesive layer and the structural layer at different times or locations, which may afford cost advantages. And the release liner could have the single-sided silicone treatment referred to above.

An alternate form of the panel material of the present invention is illustrated in FIG. 3 at 30. This panel material includes only a thermoformable structural layer 32, such as felt, with no A-side layer. A pressure sensitive adhesive layer 34 and release liner 36 are applied as in the above embodiment. The point here is that the PSA system of the present invention can be used on parts that do not require a cosmetic outer surface. Examples of this are insulation parts that are not exposed to an automotive interior.

While a preferred form of the invention has been shown and described, it will be realized that alterations and modifications may be made thereto without departing from the scope of the following claims.

What is claimed is:

1. A panel for covering a substantially rigid substrate having a non-flat contour, the panel comprising a thermoformable structural layer, the structural layer having sufficient stiffness to impart to the panel a permanent, non-flat contour generally matching that of the substrate, a moldable pressure sensitive adhesive on the structural layer and a thermoformable release liner covering the adhesive, the structural layer being able to withstand thermoforming temperatures of at least about 300° F. and the moldable pressure sensitive adhesive being able to withstand thermoforming temperatures of at least about 300° F.

2. The panel of claim 1 further comprising an A-side layer laminated to the structural layer, the A-side layer by itself having insufficient stiffness to retain a particular shape.

3. The panel of claim 1 wherein the structural layer comprises a thermoformable foam.

4. The panel of claim 1 wherein the release liner is made of polymer film.

5. The panel of claim 4 wherein the release liner is made of polyester.

6. The panel of claim 5 further comprising a coating of silicone on at least one side of the release liner.

7. The panel of claim 6 further comprising a coating of silicone on each side of the release liner and an inhibitor on one of the coatings of silicone.

8. The panel of claim 1 wherein the pressure sensitive adhesive is based on a blocked copolymer system.

9. The panel of claim 8 wherein the pressure sensitive adhesive is a styrene isoprene styrene block copolymer pressure sensitive adhesive.

10. The panel of claim 1 wherein the pressure sensitive adhesive is selected from the group consisting of acrylic, butadiene-acrylonitrile, butyl rubber, natural rubber, silicone, polychloroprene, polyvinyl acetate, polyvinyl ether, polyurethanes or other synthetic rubber or resin systems.

11. A pressure sensitive adhesive system for use with a thermoformable panel having a non-flat contour, comprising a moldable pressure sensitive adhesive on one side of the panel and a thermoformable release liner covering the adhesive, the adhesive and release liner being able to withstand thermoforming temperatures of at least about 300° F.

12. The panel of claim 11 wherein the release liner is made of polymer film.

13. The pressure sensitive adhesive system of claim 12 wherein the release liner is made of polyester.

14. The pressure sensitive adhesive system of claim 13 further comprising a coating of silicone on at least one side of the release liner.

15. The pressure sensitive adhesive system of claim 14 further comprising a coating of silicone on each side of the release liner and an inhibitor on one of the coatings of silicone.

16. The panel of claim 11 wherein the pressure sensitive adhesive is based on a blocked copolymer system.

17. The panel of claim 16 wherein the pressure sensitive adhesive is a styrene isoprene styrene block copolymer pressure sensitive adhesive.

18. The panel of claim 11 wherein the pressure sensitive adhesive is selected from the group consisting of acrylic, butadiene-acrylonitrile, butyl rubber, natural rubber, silicone, polychloroprene, polyvinyl acetate, polyvinyl ether, polyurethanes or other synthetic rubber or resin systems.

19. A method of making a panel for covering a substantially rigid substrate having a non-flat contour, comprising the steps of:

applying a moldable pressure sensitive adhesive and a thermoformable release liner to a thermoformable structural layer with the pressure sensitive adhesive between the structural layer and the release liner; and thermoforming the structural layer, pressure sensitive adhesive and release liner at a temperature of at least about 300° F. to impart to the panel a permanent, non-flat contour generally matching that of the substrate.

20. The method of claim 19 wherein the step of applying the pressure sensitive adhesive and thermoformable release liner is characterized by first applying the pressure sensitive adhesive to the release liner and then attaching the release liner and adhesive to the thermoformable structural layer.

21. The method of claim 19 wherein the step of applying the pressure sensitive adhesive and release liner is characterized by applying the pressure sensitive adhesive to a carrier sheet, attaching the carrier sheet and adhesive to the thermoformable structural layer, removing the carrier sheet, and attaching the thermoformable release liner to the adhesive.

22. A panel for covering a substantially rigid substrate having a non-flat contour, the panel being made by the process of applying a moldable pressure sensitive adhesive to a thermoformable release liner, attaching the pressure sensitive adhesive and release liner to a thermoformable structural layer, and thermoforming the structural layer, pressure sensitive adhesive and release liner at a temperature of at least about 300° F. to impart to the panel a permanent, non-flat contour generally matching that of the substrate.

23. A panel for covering a substantially rigid substrate having a non-flat contour, the panel being made by the process of applying a moldable pressure sensitive adhesive to a carrier sheet, attaching the carrier sheet and adhesive to a thermoformable structural layer, removing the carrier sheet leaving the adhesive on the structural layer, attaching a thermoformable release liner to the adhesive, and thermoforming the structural layer, pressure sensitive adhesive and release liner at a temperature of at least about 300° F. to impart to the panel a permanent, non-flat contour generally matching that of the substrate.

* * * * *